Nov. 27, 1951  R. A. NEAL  2,576,352
FUEL GOVERNOR FOR JET ENGINES
Filed Sept. 15, 1947
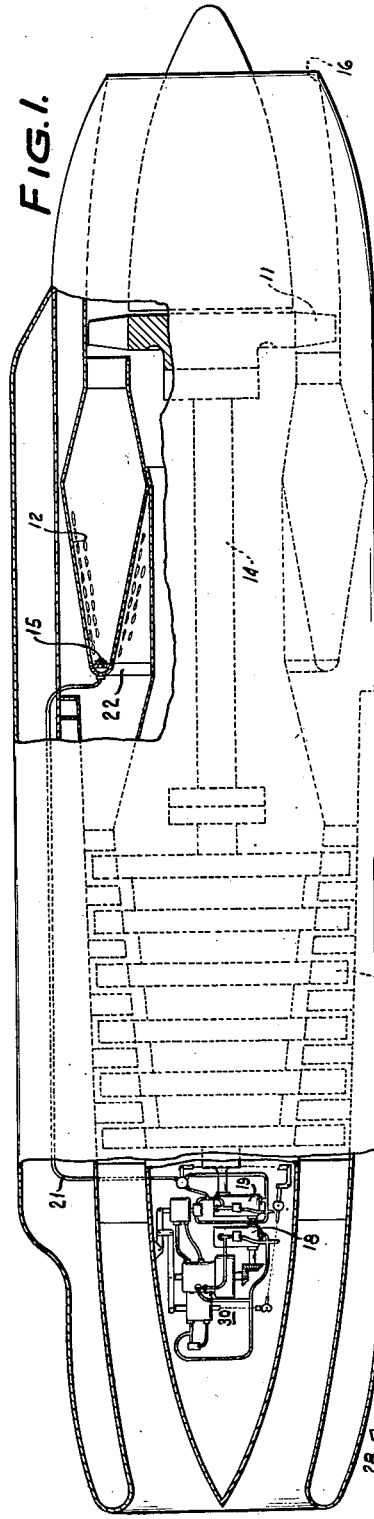
INVENTOR
ROBERT A. NEAL
BY
ATTORNEY Patented Nov. 27, 1951

2,576,352

UNITED STATES PATENT OFFICE 2,576,352

FUEL GOVERNOR FOR JET ENGINES

Robert A. Neal, Media, Pa., assignor, by mesne assignments, to the United States of America as represented by the Secretary of the Navy Application September 15, 1947, Serial No. 774,075

6 Claims. (Cl. 60—39.28)

The present invention relates to a jet engine plant, comprising a propulsion jet provided by the exhaust of a turbine driving a compressor and driven by gaseous motive fluid produced by the combustion of fuel supported by air supplied by the compressor from the atmosphere, the jet engine having liquid fuel supplied thereto under control of a throttle lever, and it has for an object to provide a governor whose speed setting is adjusted by manual operation of the throttle lever to increase or decrease the fuel feed and which operates to correct the speed change due to load change with the result that maximum power is available for take-off and the plant may be operated safely near the maximum speed while avoiding stalling of the compressor on account of increase in turbine speed due to decrease in compressor load incident to increase in altitude.

The purpose of the present manually-adjustable fuel control system is to provide for substantially constant jet engine speed for each throttle setting independent of operating conditions, such as flight speed and altitude. As the altitude of operation of a jet engine, having a conventional governor, is increased, the Mach number is increased and the compressor may stall or its operation may approach quite close to the stall point. For this reason, increase in speed with increase in altitude should be guarded against. Further, as the jet engine is usually designed to be as light as possible, the maximum safe operating speed is very close to the maximum speed actually used; and, for this reason, the conventional governor has to be set to limit the maximum engine speed at some altitude and maximum power cannot be obtained for take-off. Therefore, in accordance with the present invention, the manually-operated throttle is used to control the speed setting of an isochronous or speed-corrected governor with the result that, not only is maximum power available and usable for take-off, but the speed used may be quite close to the maximum safe operating speed without danger of stall because of increase in engine speed within the inherent range of the ordinary governor.

Furthermore, it is old in the art to supply the combustor of appratus of the above character with fuel by means under the control of a governor driven by the turbine; however, as the fuel itself is used as the operating medium of the governor or controlling mechanism, not only is such medium a poor lubricant for pistons, valves and the like, but the latter have to be made with close fits to minimize leakage and sticking is likely to occur. Oil, instead of low-viscosity fuel, is used to obtain all controlling effects, that is, a pump furnishes oil to the governor, which operates to provide a controlled oil pressure used to control the flow of fuel to the combustor atomizers. By the use of oil, the clearances of relatively movable parts may be larger, better lubrication thereof secured, and tendency to stick or bind reduced. Therefore, a further object of the invention is to provide a plant of the above character wherein all controlling effects are secured by the use of oil.

A further object of the invention is to provide fuel-controlling apparatus of the above character operable by means including a manually-operable throttle lever and which is constructed and arranged to provide for rapid adjustment with movement of the throttle lever to reduce the fuel feed and which is constructed and arranged to provide for retarded movement in relation to movement of the throttle lever when the rate of fuel feed is being increased.

The foregoing and other objects are effected by the invention as will be apparent from the following description and claims taken in connection with the accompanying drawing, forming a part of this application, in which:

Figure 1 is an elevational view of a turbo-jet unit having the improved fuel-feeding system applied thereto; and Figs. 2 and 3 are diagrammatic views of apparatus used to control the rate of fuel feed.

In the drawing, there is shown a jet engine plant including a compressor 10, preferably of the axial-flow type, driven by a turbine 11. Atmospheric air entering the compressor is compressed thereby and furnished to combustion apparatus, preferably taking the form of a combustor 12 arranged between the compressor and the turbine and about the connecting drive shaft 14 thereof. Air entering the combustor or combustors supports combustion of atomized fuel supplied thereto by the atomizers 15 and gaseous motive fluid, consisting of products and air, issuing from the combustors, is supplied to the turbine and exhausts from the latter to pass through the propulsion jet nozzle 16, heat energy of the motive fluid being transformed into mechanical energy in the turbine to drive the compressor and into velocity energy in the nozzle 16 to form the propulsion jet.

Satisfactory operation of a plant of this character involves avoiding or minimizing surging or stalling of the compressor and excessive or destructive temperatures. In accordance with the present invention, good performance in these respects is secured by the improved fuel supply system wherein the rate at which fuel is supplied to the atomizers is normally under control of a speed-corrected or isochronous governor driven by the turbine and provided with speed-setting means whose adjustment is limited by the rapidity with which the fuel supply rate may be increased and is operative to diminish the fuel supply rate quickly.

By having the fuel supply rate under control of a governor of the above character, the plant is automatically effective to avoid compressor stalling and excessive temperatures incident to increase in altitude. As the altitude increases, the density of the atmosphere decreases, and, with the fuel rate continuing the same, the reduced compressor load would result in increase in temperature and speed. As the governor is speed-corrected or isochronous and is responsive to speed of the turbine, it senses any change in speed produced, for example, by change in altitude, to adjust the fuel rate for maintenance of a substantially constant speed. Thus, the plant is protected against overheating and better performance on the part of the compressor is secured.

The plant includes an oil pump 18 and the fuel supply system has a pump 19, both pumps being mechanically driven from the turbine.

The fuel pump 19 has a suction passage or space 20, through which liquid fuel is withdrawn from the tank, and a discharge passage 21 for furnishing fuel to the manifold 22 to which the combustor atomizers 15 are connected. The passage 21 is connected by a bypass 24 to the suction space and having the usual spring-loaded relief valve 25 effective to limit the maximum pump delivery pressure.

A valve 26 is normally operable during the starting period to control flow through the passage 21 to the atomizers and to control a bypass passage 27, effective to return fuel to the suction space as flow to the atomizers is restricted. Preferably, as shown in Fig. 3, the valve 26 is mechanically connected for manual operation by the throttle lever 28, also used, as hereinafter described, to adjust the speed setting of the governor driven by the turbine and which operates to control the flow of fuel through the passage 21 to the atomizers to maintain a substantially constant turbine and compressor speed. The valve 26 serves to control the fuel flow in the starting period until idle speed is reached and to provide for emergency manual control of the fuel in case of failure of the governor system.

Referring to the governor system, there is shown a flyweight governor, at 30, driven from the turbine and which develops governing force varying as the square of the speed and imposed as thrust on the lower end of the valve member 31 of the relay, at 32, and including the cylinder 33 having a pressure-supply port 34, a drain port 35, and a servo-motor controlling pressure port 36.

The drain port 35 opens into the drain space, generally indicated at 37, and which communicates with the suction passage 38 of the oil pump. The supply port 34 opens into the space 39 to which oil is delivered by the pump 18, a desired pressure being maintained in the space by a spring-loaded relief valve 40, which opens to allow oil to by-pass to the space 37. The controlling-pressure port 36 opens into controlling-pressure space, generally indicated at 41.

The relay piston valve 31 has lands 42 and 43 separated by the channel 44. The channel 44 is continuously open to the servo-motor controlling pressure port 36; and, in neutral or cutoff position, the lands 42 and 43 just lap the pressure-supply and drain ports 34 and 35.

Governor thrust applied to the lower end of the relay piston valve is opposed by the relay spring 45 so that upward movement of the piston valve member, in consequence of increase in governor force, is opposed by increasing spring force. On the other hand, with decline in governor force, the relay piston valve is moved downwardly by the spring. Assuming the piston valve member to be in neutral or cutoff position, only very slight upward movement thereof is necessary to establish sufficient communication of the controlling pressure space 41 with the drain port for reduction in servo-motor controlling pressure and only very slight downward movement is required for increase in such pressure.

The servo-motor controlling pressure space 41 is formed in part by the expansible chamber 46 of the servo-motor, at 47, the latter including a piston 48 with which the cylinder cooperates to define the expansible chamber 46 below the piston and a chamber 49 above the latter. The force of controlling pressure acting on the piston is opposed by that of a spring 50 in the chamber 49. The piston 48 is carried by a rod 51 whose lower end is connected to the fuel by-pass control valve, at 52, and whose upper end is connected to follow-up mechanism, at 53, the latter being operative, in response to servo-motor piston movement, in consequence of controlling pressure change produced by governor force change, to change the force of the relay spring 45 in a direction to restore the relay piston valve to neutral or cut-off position.

The fuel by-pass control valve, at 52, preferably includes a cylinder 54 having a port 55 open to the fuel supply line 21 and a port 56 open to the by-pass 24. A piston 57 carried by the lower end of the rod 51 is arranged to cover and uncover the port 55. Therefore, the governor operates, through the relay and the servo-motor, to position the by-pass valve, at 52, to vary the by-pass area to control the supply of fuel for speed control of the turbine and the compressor. As shown the piston 57 has an orifice or orifices 57a impeding rapid movement thereof and preventing downward movement being blocked. Also the lower limit of downward movement may be varied by adjustment of the piston abutment screw 57b carried by the servo-motor at 47.

Not only does the follow-up mechanism, at 53, use servo-motor piston movement to adjust the relay spring 45 for return of the relay piston valve to neutral, but it is arranged also to provide for adjustment of such spring to change the speed setting of the governor. Accordingly, the upper end of the rod 51 is pivotally connected to one end of the lever 58 having a fixed fulcrum 59 at its other end and pivotally connected at an intermediate point to a link 60, which is pivotally connected to one end of the floating lever 61. The floating lever is connected at its other end to the adjustable fulcrum 62, and, at an intermediate point, to a rod 63 whose lower end has an abutment 64 engaging the relay spring 45. By adjusting the fulcrum 62 up and down, the force of the relay spring may be varied to change the governing speed, upward adjustment thereof being effective to reduce the governing speed and vice versa.

The fulcrum, at 62, is adjusted by means, at 66, which is operative to move the fulcrum upwardly rapidly to reduce the fuel supply and to move the fulcrum downwardly at a limited rate to control the acceleration incident to increasing the speed. Preferably, the apparatus, at 66, includes a rod 67 whose upper end carries the fulcrum 62 and whose lower end is arranged to abut the cam 69 adjustable angularly by the throttle lever 28. With rotation of the cam in one direction, the rod is lifted against the force of the spring 71 to raise the fulcrum, and, with rotation in the other direction, the spring causes the rod to follow the cam to lower the fulcrum.

The rod 67 carries a piston 72 in the cylinder 73. The spaces above and below the piston are connected by the passages 74 and 75, the passage 74 being provided with a check valve 76 opening in the direction from the upper space to the lower space, and the passage 75 being formed in the piston and having an orifice 77 for restricting flow therethrough. The drain space 37 is connected to the upper cylinder space, thereby assuring of the spaces above and below the piston and the passages being filled with oil. The rod and piston may be pushed up rapidly to reduce the fuel feed, oil passing by the check valve 76 and through the passage 74 to the lower cylinder space to avoid any suction effect impeding upward movement. While the throttle lever and the cam may be moved rapidly in the other direction, the rapidity with which the rod 67 may move downwardly to follow the cam is limited by the orifice 77.

With the apparatus so far described and with any speed setting, inherent regulation of the governor in meeting variations in load, occasioned, for example, by compressor load changes due to changes in altitude, may involve speed changes having undesired effects so far as temperature and compressor performance are concerned. To avoid or minimize these undesired effects, a compensator is provided in connection with the relay piston valve and which is effective, in response to speed change due to load change, to adjust the fuel supply to restore the turbine speed at the new load.

The speed compensator includes a compensating chamber 78 between the relay piston valve 31 and a compensating piston 79 whose upper end is engaged by the relay spring 45. A compensator spring 80, in the compensating chamber 78, engages adjacent ends of the relay piston valve and the compensating piston. Orifices 82 and 83 connect the compensating chamber with the servo-motor control-pressure space 41 and with the drain space 37, respectively, such orifices operating normally to maintain a proportional relation of compensator and servo-motor controlling pressure. Preferably, the compensating chamber communicates with the accumulator chamber 84 formed by the housing 85 and bellows 86, the latter being distended by the spring 87 to diminish the volume of the chamber. The accumulator provides for considerable flow into or out of the compensating chamber incident to change in compensating pressure, whereby a time delay or lag is introduced into the compensating system.

Assuming a decrease in compressor load due to increase in altitude and the consequent increase in turbine speed, the governor moves the relay piston valve upwardly to reduce the servo-motor controlling pressure for downward movement of the servo-motor and by-pass valve to reduce the fuel feed to limit the turbine speed, and it will be apparent that the relay piston valve and the compensating piston tend to move together as a unit because of the delayed escape of liquid from the compensating chamber in relation to the decline in servo-motor controlling pressure. Regarding the relay piston valve and the compensating piston as an instantaneous unitary structure, the resulting movement of the servo-motor would compress the relay spring 45 such that a higher turbine speed would be required for balancing with the piston valve in neutral; however, as the liquid pressure in the compensating chamber is gradually reduced to re-establish the proportional relation to the reduced servo-motor controlling pressure, the spring 45 is relieved to the extent of the pressure reduction in the compensating chamber, with the result that the governor is effective at a somewhat lower speed to position the piston valve in neutral, that is, the compensator has the effect of compensating for the increase in turbine speed that would otherwise be required on account of the increase in force of the spring 45 because of downward movement of the servo-motor to open the by-pass valve wider.

On the other hand, should the turbine tend to slow down, the spring 45 is instantaneously effective to move the compensating piston and the relay piston valve downwardly as a unit to increase the controlling pressure, causing the servo-motor and the fuel by-pass valve to move upwardly to restrict by-passing of fuel and thereby to cause more fuel to flow to the combustor to increase the speed of the turbine, the servo-motor movement, acting through the follow-up mechanism to relax the spring 45, with the result that the neutral position tends to be reached at a somewhat lower speed than normal; however, because of departure of the compensating chamber and servo-motor controlling pressures from proportional relation due to increase in controlling pressure, liquid flows into the compensator chamber through the orifice 82 until the proportional relation of pressures is re-established, this process involving an added increase in controlling pressure to increase the fuel feed to compensate the governor for speed change.

The compensator operates, in effect, to lengthen or shorten the relay piston valve, depending upon the direction of speed change. If the turbine speed tends to increase, due to decrease in compressor load occasioned by increase in altitude, the governor operates to restrict the fuel feed, the relay valve aggregate, including the relay valve and the compensator piston, being instantaneously capable of preserving its overall length because of the pressure of liquid in the compensator chamber 78; however, as the pressure is gradually reduced in the chamber 78 to re-establish the proportional relation with respect to the lowered controlling pressure, the relay piston aggregate is thereby reduced in length with such reduction being opposed by the increasing force of the spring 80 undergoing compression, whereby the governor and the relay spring 45 are brought into balance with a somewhat less force of such relay spring and with the turbine speed corrected for the load change.

On the other hand, with any speed setting, should the turbine load increase due to decrease in altitude, the turbine speed decreases temporarily with the governor operating to increase the controlling pressure for the servo-motor to increase the fuel feed, and then flow of liquid takes place from the controlled liquid pressure space to the compensator chamber through the orifice 82 to re-establish the proportional relation of compensator and controlling pressures and the relay piston aggregate increasing in length, with reduction in force of the compensator spring 80 corresponding to the increase in compensator chamber pressure, until the proportional relation of compensator and controlling pressures is re-established, this action involving increase in relay spring load and further increase in controlling pressure with increase in fuel feed to increase the turbine speed for speed correction.

From the foregoing, operation of the apparatus described will be apparent. The throttle lever 28 has an initial range of movement during which the valve 26 is moved from the position, cutting off communication of the fuel pump discharge space with the atomizers and placing such discharge in communication with the pump inlet by means of the by-pass passage, to the position, opening communication of the pump discharge passage to the atomizers and cutting off communication with the by-pass, such movement of the valve 26 being required for starting and bringing the plant up to idling speed. Preferably, the by-pass valve 26 is mechanically connected, in any suitable manner, to the throttle lever for operation by the latter. As shown, the cam 69 has a high portion a—b of constant radius and the by-pass valve is connected for operation during traversal of the cam surface from a to b and vice versa relative to the acceleration-control push rod 67. With the plant idling and the valve 26 closing its by-pass, the cam is movable by the throttle lever to traverse the cam surface underneath the push rod from the high point b to the low point c; and, while this traversal may be effected as rapidly as desired, the following motion of the push rod under the influence of its biasing spring, is limited by the flow rate of the orifice 77 so that the fuel feed may be increased at a predetermined gradual rate independently of the rate at which the cam is moved. On the other hand, when the plant is to be shut down, it is desirable, not only to reduce quickly the fuel feed, but to interrupt rapidly the fuel pump discharge passage to the atomizers and to by-pass fuel discharging from the pump to the inlet of the latter. Therefore, there is provided, for the acceleration-control piston 72, a by-pass 74 provided with a check valve 76, which opens when the push rod 67 is moved by the cam against the force of the spring whereby the cam surface may be rapidly traversed from c to b underneath the push rod to open the fuel by-pass control valve at a rapid rate and from b to a to effect rapid operation of the valve 26 to interrupt communication of the fuel pump discharge space with the atomizers and to place such space in communication with the inlet of the pump.

While the invention has been shown in but one form, it will be obvious to those skilled in the art that it is not so limited, but is susceptible of various changes and modifications without departing from the spirit thereof.

What is claimed is:

1. In a fuel system for a gas turbine, the combination of, a fuel pump driven by the turbine, a passage for delivering fuel from the pump for operation of the gas turbine, first and second by-pass passages for the delivery passage, a by-pass valve for the first by-pass passage, a control valve movable from a position opening the second by-pass passage and interrupting the delivery passage to a position opening the delivery passage and closing the second by-pass passage, a device for operating the by-pass valve, said device including a spring for moving said by-pass valve in the direction to increase by-passing and means responsive to pressure for moving the by-pass valve against the force of the spring in the direction to reduce by-passing, a relay movable from neutral position by changes in forces applied thereto to vary the pressure of liquid supplied to said device, a spring exerting force on the relay in the direction for increase in liquid pressure acting on said device to reduce by-passing, a governor operated by the turbine and exerting its force on the relay in opposition to that of the relay spring and in the direction for decrease in the liquid pressure acting on said device to increase by-passing, an abutment for the relay spring, follow-up means operated by said device to move the relay spring abutment to change the relay spring force until the latter balances the governing force with the relay restored to neutral position, a throttle lever, and mechanism operated by movement of the throttle lever over the initial portion of its travel to move the control valve from its position interrupting the fuel delivery passage and opening the second by-pass passage to its position opening the delivery passage and closing the second by-pass passage and operable by further movement of the lever in the same direction to adjust the follow-up means to change the speed setting of the relay spring.

2. In a fuel system for a gas turbine, the combination of, a fuel pump driven by the turbine, a passage for delivering fuel from the pump for operation of the turbine, a by-pass passage communicating with the delivery passage, a by-pass valve for the by-pass passage and operable to vary its flow area, an operating piston connected to said by-pass valve, a spring exerting force on the operating piston in the direction for movement of the by-pass valve to increase its flow area, means for applying liquid under controlling pressure to said operating piston to exert force thereon in opposition to that of said spring and in the direction for movement of the by-pass valve to decrease its flow area, said means including a relay operable to vary the controlling pressure, a relay spring exerting force on the relay in the direction for movement of the latter for increase in controlling pressure acting on said operating piston to decrease the by-pass valve flow area, an abutment for the relay spring and movable to vary the loading of the latter, a speed-responsive governor driven by the turbine and applying force to the relay in opposition to that of the relay spring and in the direction for decrease in controlling pressure acting on the operating piston to increase the by-pass valve flow area, follow-up mechanism operable by movement of the operating piston to move said abutment to vary the relay spring loading so that movement of the operating piston in the direction to diminish the by-pass flow area is accompanied by movement of the relay spring abutment in the direction for decreasing relay spring loading and vice versa, a throttle lever, means operated by the throttle lever to move the relay spring abutment for increase or decrease in the relay spring load to vary the governor speed setting, and a compensator effective at any governor speed setting in response to controlling-pressure change incident to speed change due to change in turbine load to modify the relay spring load in the direction for correction of the turbine speed.

3. Apparatus as claimed in claim 2 wherein the means for adjusting the speed setting of the governor includes a rod movable lengthwise to move the relay spring abutment, a biasing spring for the rod; a cam movable angularly with the throttle lever and engageable with one end of the rod so that, with movement of the cam in one direction, the rod is positioned thereby against the force of the biasing spring to move the relay spring abutment in the direction to reduce the relay spring load, and, with movement of the cam in the other direction, the biasing spring acts on the rod to move the latter to follow the cam and to move the relay spring abutment to increase the relay spring load; a piston carried by the rod; a cylinder for the piston and providing spaces at opposite sides of the latter; means for maintaining the cylinder spaces filled with oil; a pair of passages connecting the cylinder spaces at opposite sides of the piston; an orifice in one of the passages; and a check valve in the other passage and opening in the direction for flow of liquid from one cylinder space to the other when the rod is moved against the force of its biasing spring by the cam.

4. Apparatus as claimed in claim 2 wherein the relay includes a piston valve and the compensator includes a compensator piston engaged by the relay spring, means providing an expansible compensator chamber between the compensator piston and the relay piston valve, a spring in the compensator chamber and engaging adjacent ends of the compensator piston and of the relay piston valve to oppose diminution in volume of the compensator chamber, an inlet orifice for the compensator chamber and supplied with liquid under controlling pressure, a discharge orifice for the compensator chamber, and an accumulator communicating with the compensator chamber.

5. In a fuel system for a gas turbine, the combination of, a fuel pump driven by the turbine; a passage for delivering fuel from the pump for operation of the turbine; a by-pass passage communicating with the delivery passage; a by-pass valve for the by-pass passage and operable to vary its flow area; an operating piston connected to said by-pass valve; a spring exerting force on the operating piston in the direction for movement of the by-pass valve to increase its flow area; means for supplying liquid under controlling pressure to said operating piston to exert force thereon in opposition to that of said spring and in the direction for movement of the by-pass valve to decrease its flow area and said means including a relay operable to vary the controlling pressure; a relay spring exerting force on the relay in the direction for movement of the latter for increase in controlling pressure acting on said operating piston to decrease the by-pass valve flow area; an abutment for the relay spring and movable to vary the loading of the latter; a speed-responsive governor driven by the turbine and applying force to the relay in opposition to that of the relay spring and in the direction for decrease in controlling pressure acting on the operating piston to increase the by-pass valve flow area; follow-up mechanism operable by movement of the operating piston to move said abutment to vary the relay spring loading so that movement of the operating piston in the direction to diminish the by-pass flow area is accompanied by movement of the relay spring abutment in the direction for decreasing the relay spring load and vice versa; said follow-up mechanism including a first lever pivotally connected at one end to the operating piston, a fixed fulcrum for the other end of the lever, a second lever, a link pivotally connected to the first lever at an intermediate point of the latter and to one end of the second lever, a fulcrum for the other end of the second lever, and a link pivotally connected to the intermediate point of the second lever and attached to the relay spring abutment; a manually-operable lever; means controlled by the manually-operable lever to move the fulcrum of said second lever to increase or decrease the relay spring load to vary the governor speed setting; means cooperating with the last-named means to provide for rapid movement of the fulcrum as the manually-operable lever is moved to reduce the relay spring load and providing, with movement of the manually-operable lever in the other direction, for movement of the fulcrum at a suitably retarded rate to increase the relay spring load; and a compensator effective, at any governor speed setting, in response to controlling pressure change pursuant to speed change due to change in turbine load to modify the relay spring load in the direction for correction of the turbine speed.

6. In a fuel system for a gas turbine, the combination of, a fuel pump driven by the turbine; a passage for delivering fuel from the pump for operation of the turbine; a by-pass passage communicating with the delivery passage; a by-pass valve for the by-pass passage and operable to vary its flow area; an operating piston connected to said by-pass valve; a spring exerting force on the operating piston in the direction for movement of the by-pass valve to increase its flow area; means for supplying liquid under controlling pressure to said operating piston to exert force thereon in opposition to that of said spring and in the direction for movement of the by-pass valve to decrease its flow area and said means including a relay operable to vary the controlling pressure; a relay spring exerting force on the relay in the direction for movement of the latter for increase in controlling pressure acting on said operating piston to decrease the by-pass valve flow area; an abutment for the relay spring and movable to vary the loading of the latter; a speed-responsive governor driven by the turbine and applying force to the relay in opposition to that of the relay spring and in the direction for decrease in controlling pressure acting on the operating piston to increase the by-pass valve flow area; follow-up mechanism operable by movement of the operating piston to move said abutment to vary the relay spring loading so that movement of the operating piston in the direction to diminish the by-pass flow area is accompanied by movement of the relay spring abutment in the direction for decreasing relay spring load and vice versa; said follow-up mechanism including a first lever pivotally connected at one end to the operating piston, a fixed fulcrum for the other end of the lever, a second lever, a link pivotally connected to the first lever at an intermediate point of the latter and to one end of the second lever, a fulcrum for the other end of the second lever, and a link pivotally connected to the intermediate point of the second lever and attached to the relay spring abutment; a rod having the fulcrum of the second lever attached to one end thereof; a biasing spring for the rod; a cam engaging the other end of the rod and effective, upon movement in one direction, to push the rod against the force of the biasing spring to move the fulcrum of the second lever and thereby move the relay spring abutment in the direction to reduce the relay spring load, and, effective, upon movement in the other direction, to provide for the biasing spring acting on the rod to cause it to move to follow the cam and to move the fulcrum of the second lever in the direction to move the relay abutment to increase the relay spring load; a throttle lever connected to the cam; a piston carried by the rod; a cylinder for the piston and providing spaces at opposite sides of the latter; means providing for said cylinder spaces being maintained filled with the liquid; a pair of passages connecting the spaces at opposite sides of the piston; an orifice in one of the passages; a check valve in the other passage and opening in the direction for flow of liquid from one cylinder space to the other when the rod is moved against the force of its biasing spring by the cam; and a compensator effective at any governor speed in response to controlling pressure change pursuant to speed change due to change in turbine load to modify the relay spring load in the direction for correction of the turbine speed; said compensator including a piston engaged by the relay spring, means providing an expansible chamber between the compensator piston and the relay piston valve, a spring in said chamber and engaging adjacent ends of the compensator piston and of the relay piston valve to oppose diminution in volume of the compensator chamber, orifices connecting the compensator chamber to the controlling-pressure space and to the exhaust space, and an accumulator for the compensator chamber.

ROBERT A. NEAL.

REFERENCES CITED

The following references are of record in the file of this patent:

UNITED STATES PATENTS

| Number | Name | Date |
|---|---|---|
| 1,231,257 | Herr | June 26, 1917 |
| 2,219,994 | Jung | Oct. 29, 1940 |
| 2,263,705 | Seippel | Nov. 25, 1941 |
| 2,411,065 | Silvester | Nov. 12, 1946 |

FOREIGN PATENTS

| Number | Country | Date |
|---|---|---|
| 160,847 | Switzerland | June 16, 1933 |